Feb. 22, 1966 S. GEWIRTZ 3,237,119
ISOLATION AMPLIFIER HAVING HIGH LINEARITY AND AN EFFECTIVE ZERO INPUT CAPACITANCE OVER A WIDE FREQUENCY RANGE
Filed March 26, 1962
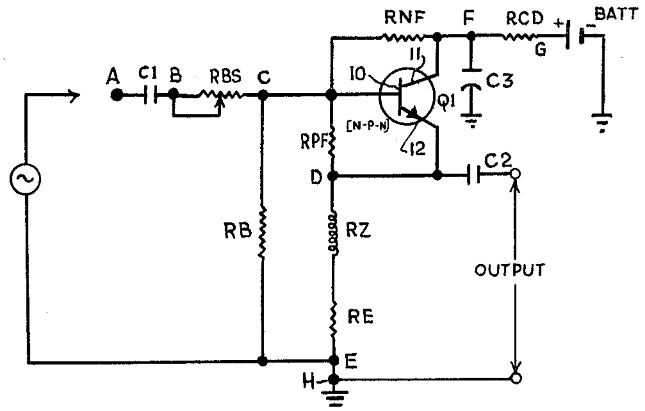
INVENTOR.
STANLEY GEWIRTZ
BY Samuel Stoll
ATTORNEY United States Patent Office 3,237,119
Patented Feb. 22, 1966

3,237,119

ISOLATION AMPLIFIER HAVING HIGH LINEARITY AND AN EFFECTIVE ZERO INPUT CAPACITANCE OVER A WIDE FREQUENCY RANGE

Stanley Gewirtz, New York, N.Y., assignor to Solid State Systems, Inc., New York, N.Y.

Filed Mar. 26, 1962, Ser. No. 182,511
1 Claim. (Cl. 330—25)

This invention concerns an isolation amplifier having high linearity and an effective zero input capacitance over a wide frequency range.

A principal object of the invention is to provide an isolation amplifier in which input capacitance is zero over a wide frequency operating range.

Another object is to provide an A.C. emitter-follower circuit which has zero change in input impedance with frequency increase.

A further object is to provide an A.C. emitter-follower which has an input impedance which is stable with changes in temperature and voltage.

The invention will be best understood from the following detailed description taken together with the drawing, in which the single figure is a circuit diagram of an emitter-follower embodying the invention.

It may be said here that in the normal emitter-follower, the collector of the transistor is grounded and the emitter is connected through a resistor to ground. For increased stability a voltage divider is used between the positive and negative sides of the power supply, and the center of the divider is used as a base bias voltage source.

Viewing this circuit from a frequency standpoint, there are plainly two quantities which are mutually active in degrading the input frequency response in accordance with increasing frequency. There is also a lack of protection over thermal runaway and little consistency of gain at changing temperatures. All amplifying devices, including transistors and vacuum tubes, have gain-bandwidth products, resulting in a decreased gain in current with increase of frequency.

Another problem is the shunting in an amplifying device of the control element to the anode and cathode elements by a capacitance which is the natural consequence of their affinity and necessary geometrical relationship. When used in emitter and cathode followers, this shunting results in a loss of input impedance with increasing frequency. This result of the shunt capacitance is plain, as the capacitive reactance is equal to $$\frac{1}{2\pi FC}$$

The reactance of capacitor decreases with increasing frequency. This reactance operates in parallel with input impedance.

This, of course, is why all present-day laboratory equipment used for measurement of A.C. voltages and currents have a specified input impedance at 1,000 cycles and include a shunting capacitance figure which is claimed to shunt the input terminals. From these figures, the user can calculate the real input impedance at various frequencies. A typical example of the results of this problem is an oscilloscope with an input impedance of 1 megohm at 1,000 cycles and 13,000 ohms at 200,000 cycles. The effect of this in using the instruments which exhibit these characteristics is (1) overloading of measured high-frequency circuits, and (2) when relating to oscillators, the presentation of measured data being only accurate when the instrument that is measuring the circuit is across it and changing when the instrument is removed. This becomes very troublesome with such instruments as frequency counters and frequency measuring equipment, where the user is under the impression that the frequency that his instrument is indicating as his operating frequency is his actual frequency. This is not so; and can be beautifully displayed by looking at the equation for a resonant tank or a phase shift network or any system whereby capacitance plays an important frequency determining role. In the resonant tank, the frequency of resonance is equal to $$\frac{1}{2\pi\sqrt{LC}}$$

while in the phase shift network, the frequency is determined by $$\frac{1}{2\pi RC}$$

As is obvious, since all oscillator circuits and all tuned circuits and all phase shift networks have a primary dependence of their frequency on capacitive reactance, the present-day problem is quite clear.

The circuit that we disclose in this illustrative embodiment eliminates all of the aforementioned problems, as well as adding the additional feature of high temperature and voltage stabilization, constant and predictable input impedance, as well as high linearity. Whereas prior circuits as mentioned above have a reduction of input impedance due to the combined effects of reduced gain at high frequencies and the input being shunted by parallel capacitance. In our circuit we compensate for these effects by designing our emitter or cathode degeneration to be a compound impedance of resistance and inductive reactance. As is well known, the inductive reactance of a coil is equal to ($XL=2\pi FL$). (As can be seen here, the impedance of an inductive reactor increases with frequency.) The value of inductive reactor chosen is calculated, based on the gain characteristics of the amplification device at high frequencies and the consequent resultant required increase in the cathode or emitter impedance to maintain the same input impedance, plus an additional inductance required to create an overswing in input impedance required to operate in parallel with the shunt capacitance in order to neutralize the effects thereof. The low frequency input impedance is determined by the emitter resistor in parallel with the biasing resistors. The high frequency impedance is determined by the emitter resistor in series with the inductive reactance of the coil in parallel with the biasing resistors and in parallel with the shunting capacitance. As can be seen here, if the gain-bandwidth-product of the chosen transistor or other amplifying device is known and the shunting capacitance is also known, the series resistive inductive divider which is then designed into the cathode or emitter circuits can easily be calculated to create an effective zero input capacitance effect as long as the gain-bandwith-product of the transistor has been included in the design calculations.

Whereas the first and typical circuit described had little or no neutralization for temperature and voltage effects, the circuit presently presented has a system whereby these effects are neutralized. In vacuum tube circuitry, the effect of temperature and voltage is relatively small. The effect of loss of gain with the aging of the device is not small and becomes effective where a constant input impedance is required. In transistors, the influence of temperature and voltage is very great. The transistor's base bias without the shunting biasing resistor is determined by the $IC_0$ or leakage parameter, which is determined by the thermally generated EMF of the semiconductor material. What we have done in this circuit to neutralize the effects of temperature change, is to ground the collector with respect to A.C. by means of a capacitor which is large enough so as not to cause degradation at low frequencies, and to connect the collector and the junction of this capacitor in a series with a resistor, which in turn is connected to the supply voltage.

The result of the circuit hereinabove discussed is one having a closely controlled D.C. negative feed-back loop. This feed-back loop operates in the foregoing manner. When the transistor conducts at a greater level due to increased temperature or voltage, the voltage across the collector and the shunting capacitor is reduced, the voltage drop across the series resistor to the power supply is increased, resulting in a reduced supply voltage for the base biasing resistor, which is connected to the collector circuit. Reduction of the base biasing current through this resistor results in a dropping of the collector current and consequently causes a stabilization of parameters. At reduced temperatures, collector current leakage occurs due to reduced forward biasing, the voltage across the capacitor increases, the collector voltage increases, and the voltage presented to the forward bias resistor increases, thus resulting in an increased flow of current into the base bias circuit, causing an increase in collector current, thereby resulting in a stabilization of parameters. It is generally very rare wherein a single stage amplifier possesses both negative and positive feed-back loops. When the circuit is utilized as a zero phase shift amplifier with a unity voltage gain, the only conceivable scheme to achieve this is the one described in this disclosure. The positive A.C. feed-back loop is achieved by the use of resistor RPF, shown in the drawing. This resistor is directly connected to the emitter at the junction of the emitter and its compound resistive-inductive, degenerative impedance. Resistor RPF, by necessity of creating a high linearity, is kept as a high resistance. The operation of resistor RPF is determined by the zero phase shift characteristics of an emitter follower, which presents the same phase at its emitter as is present at its base. Consequently, inasmuch as the emitter output voltage is close to unity of the base input voltage, the A.C. voltage across this resistor is negligible and the loading effects of this resistor in shunt with the input impedance is so negligible that it can be ignored in final input impedance calculations. Resistor RB shunts the base circuit to ground, its purpose being two-fold; resistor RB, in series with resistor RNF, acts as a voltage divider at their junction point, which occurs at the base of the transistor, resulting in a stabilization of the biasing currents. Resistor RB also acts a damper to the high impedance forward bias produced by resistor RPF, without which resistor RPF it would create clipping of A.C. voltages at a voltage level lower than that required for the performance of this amplifier.

As can now be seen, this amplifier is both capacitance- and temperature-neutralized, as well as supply voltage stabilized. A series rheostat RBS is used and placed into the base circuit before the series coupling capacitor the voltage source employed with the amplifier; for the purpose of acting as a trimming variable resistance for the purpose of exactly calibrating the input impedance of this amplifier so as to completely neutralize the normal loss of accuracy that results from mismatch of the input impedance of said amplifier with an external range divider associated with the voltage source employed with the amplifier; this being caused by normal manufacturing tolerances. As can be clearly seen, this disclosed amplifier eliminates most of the problems associated with normal input amplifiers, and therefore results in considerably improved matching with said external range decade divider, of ranges, considerably improved frequency characteristics, considerably improved temperature and voltage characteristics.

As illustrated in the accompanying circuit diagram, the invention comprises the following elements:

Q1 is an n-p-n transistor, with a base 10, collector 11, and emitter 12. The collector is A.C.-grounded by connection at junction F, which is also connected through capacitor C3 to ground. Resistor RCD is connected between junctions F and G—the latter being the connection point of the positive side of the D.C. power supply (battery BATT), the negative side of which is connected to ground. Resistor RNF is the base biasing resistor connecting junctions F and C—the latter being the base biasing junction point of the circuit. Junction C is directly connected to the base input circuit of transistor Q1, this transistor being forward-biased by resistor RNF. Resistor RPF connects junctions C and D, the latter junction being common to capacitor C2, the emitter of the transistor, and to choke coil RZ. Junction C and ground H are connected through resistor RB. Junction C is connected to junction B through a series variable resistor or rheostat RBS for the purpose of finally trimming the input impedance of the circuit. Junction B is connected to junction A, the signal input terminal, through capacitor C1, which is used for the purpose of blocking D.C. voltages while permitting the passage of A.C. voltages to junction B and the input circuit of the amplifier. Junction D is also the connecting point of resistor RPF, a positive feedback resistor connecting the emitter circuit to the base circuit of the transistor. Resistor RPF also connects the inductive resistive compound impedance comprising that of choke coil RZ in series with that of resistor RE joined at junction E which is connected to ground H. Junction D also provides for the connection of capacitor C2 which has the purpose of blocking the output of D.C. voltage from the circuit while providing for the passage of A.C. voltages presented by the emitter of the transistor to the output terminal adapted for the presentation of A.C. voltages between the outlet and ground.

The capacitance that is measurable at the input circuit is generally greater than the collector-base capacitance of the transistor. This is caused by the tendency of an emitter follower to have close to unity voltage gain and because the input impedance of an emitter follower is controlled by the ratio of voltages found at the collector and the emitter. This means that an emitter follower is only completely effective if sufficient opposite phase A.C. signal is shunted or fed from its collector directly into the ground loop system. At increasing frequencies when the gain of the transistor is low, and the collector residual resistance remains the same, the transistor is unable to maintain a high enough reverse phase collector output to ground. This results in the loss of input impedance and is compounded by the constant impedance of a degenerative resistor resulting in an apparently greater degradation or shunting capacitance to ground of the input terminals than actual transistor capacitance dictates.

What is claimed is:

In an isolation amplifier circuit, a transistor having a base, emitter and collector, a first resistor connected between said base and ground, a series circuit comprising a second resistor, a choke and a third resistor, said series circuit being connected in parallel with the first resistor between said base and ground, a pair of circuit output terminals, a first capacitor connected between one of said output terminals and the emitter, said emitter being connected to a junction point between the second resistor and the choke, the other output terminal being connected to ground, a fourth resistor connected between the base and collector, a second capacitor connected between the collector and ground, a battery and fifth resistor connected between the collector and ground, a pair of circuit input terminals, one of said input terminals being connected to ground, a third capacitor and a variable resistor connected in series circuit between the other circuit input terminal and the base of the transistor, whereby the input terminals are shunted with an impedance of ever increasing size at increasing frequencies of signals applied to the input terminals to effect substantially no change in circuit input impedance at all input signal frequencies.

References Cited by the Examiner

UNITED STATES PATENTS

| | | | |
|---|---|---|---|
| 2,504,175 | 4/1950 | Bradley | 330—94 X |
| 2,761,916 | 9/1956 | Barton | 330—25 X |
| 2,858,379 | 10/1958 | Stanley | 330—22 X |
| 2,866,892 | 12/1958 | Barton | 330—28 X |
| 2,874,233 | 2/1959 | Guyton et al. | 330—28 |

ROY LAKE, *Primary Examiner.*

JOHN KOMINSKI, *Examiner.*